United States Patent [19]

Kanda et al.

[11] 4,317,857

[45] Mar. 2, 1982

[54] COMPOSITE COATED METAL SHEET

[75] Inventors: Katsumi Kanda; Yoshikazu Kondo, both of Kudamatsu; Yoshiyuki Sugimoto, Hikari, all of Japan

[73] Assignee: Toyo Kohan Co., Ltd., Japan

[21] Appl. No.: 104,458

[22] Filed: Dec. 17, 1979

[51] Int. Cl.$^3$ .................. B32B 5/16; B32B 15/08; B32B 27/30

[52] U.S. Cl. .................... 428/334; 428/328; 428/335; 428/336; 428/463; 428/416; 428/518; 428/520; 428/522; 428/339

[58] Field of Search .............. 428/328, 463, 522, 416, 428/518, 520, 334–336, 339

[56] References Cited

U.S. PATENT DOCUMENTS

| | | | |
|---|---|---|---|
| 3,475,213 | 10/1969 | Stow | 428/328 |
| 3,499,820 | 3/1970 | Desaulniers | 428/328 |
| 3,900,657 | 8/1975 | Nakayama | 428/328 |
| 3,987,229 | 10/1976 | Rairdon | 428/328 |

FOREIGN PATENT DOCUMENTS

| | | |
|---|---|---|
| 4625248 | 7/1971 | Japan . |
| 533410 | 2/1978 | Japan . |

*Primary Examiner*—Ellis P. Robinson
*Attorney, Agent, or Firm*—Wenderoth, Lind & Ponack

[57] ABSTRACT

A composite coated metal sheet suitable for outdoor building materials and having excellent weatherability, corrosion resistance and formability is provided herein by coating a metal sheet with a composite material essentially consisting of polyvinylchloride resin and flake-like aluminum powder, and in certain cases a metal powder and an alloy powder of zinc, tin and lead. Said composite coated metal sheet may be overlaid with an acrylic-type resin film.

7 Claims, No Drawings

COMPOSITE COATED METAL SHEET

BACKGROUND AND OBJECTIVES

I Field of the Invention

The present invention relates to a composite coated metal sheet which is suitable for outdoor building materials.

II Description of the Prior Art

Conventional coated metal sheets for outdoor building materials are as follows:

1. Precoated Galvanized Sheets

This product is a galvanized sheet coated with paint which is of the thermosetting acrylic-type, polyester type, silicon-type or fluorocarbon-type resin. The coating is 10 to 40 μm in thickness.

2. Polyvinylchloride-Metal Laminated Sheets

This product is a galvanized sheet covered with semi-rigid or flexible polyvinylchloride resin film of 100 to 300 μm thickness.

3. Polyacrylate-Metal Laminated Sheets

This product is galvanized sheet covered wih acrylic-type resin film of 50 to 100 μm thickness.

4. Polyacrylate-Polyvinylchloride-Metal Laminated Sheets

This product is a polyvinylchloride-metal laminated sheet which is overlaid with acrylic-type resin film of 50 to 100 μm thickness.

However, the above-mentioned coated metal sheets are not always adequate from the standpoint of economy and durability for outdoor building materials.

On the other hand, zinc rich paint or aluminum rich paint consisting of zinc powder or aluminum powder and organic polymer e.g. epoxy resin is used for protection of metal building materials. But such paint films are subject to cracking in industrial processes such as bending or roll forming because of low flexibility. Therefore these paints can not be used for precoated material.

Accordingly, it is one of the objects of the present invention to produce a metal sheet coated with a composition containing polyvinylchloride resin, a metal powder, plasticizer and stabilizer, said product having excellent weatherability, corrosion resistance and formability.

It is another object of the present invention to produce the said product overlaid with an acrylic-type resin film, this product having superior weatherability, corrosion resistance and formability.

BRIEF SUMMARY OF THE INVENTION

The present invention thus provides a coated metal sheet which has excellent outdoor durability and formability and is economical.

More specifically, the present invention provides a metal sheet covered with a composite material comprising polyvinylchloride resin and flake-like aluminum powder, and in certain cases a metal powder such as zinc, tin and lead or alloy powders of these metals.

This composite coated metal sheet is produced by the following method. The metal sheet is precoated with adhesive, baked by heat treatment, coated with a composite material, in paste form, containing polyvinylchloride resin, metal powder, plasticizer and stabilizer or by laminating the composite material as a film, and then baking, i.e. heat treatment. This product has excellent weatherability, corrosion resistance and formability.

Furthermore, in certain cases, this composite coated sheet may be overlaid with an acrylic-type resin film. This product has superior weatherability and corrosion resistance.

DETAILED DESCRIPTION

The present invention will be described below in more detail.

We shall begin with the composite coating.

The composite coating composition comprises polyvinylchloride resin, flake-like aluminum powder, plasticizer, stabilizer, and in certain cases a metal powder such as zinc, tin and lead and alloys of these metals. The coating composition may include agents such as pigment and filler etc. for the polyvinylchloride resin. Polyvinylchloride resin, which is one of the main components of the present invention, may include that polymerized by suspension polymerization, emulsion polymerization and solution polymerization, and may include homopolymers and copolymers.

Flake-like aluminum powder, which is the other one of the main components according to the present invention, may include a powder of under 10 μm thickness, which powder is produced by ordinary industrial methods. A thickness of more than 10 μm is undesirable because it impairs the appearance of the coated surface. The particle diameter of aluminum powder is not restricted but a smaller size is preferred. Powders other than aluminum may be included for the purpose of further improving corrosion resistance, e.g. the metal powders such as zinc, tin, lead and alloys of these metals. In these powders, a diameter of more than 70 μm is undesirable because it impairs the appearance of the coating surface.

Plasticizers and stabilizers, which are components of the present invention, may include those conventionally used for polyvinylchloride resins.

The formula for the composite materials is as follows:

| | |
|---|---|
| polyvinylchloride: | 100 parts |
| flake-like aluminum powder: | 5-70 |
| metal powder other than aluminum powder | 0-145 |
| plasticizer: | as needed |
| stabilizer: | as needed |

However, the total amount of flake-like aluminum powder and powder other than aluminum powder must not be over 150 parts.

An amount of flake-like aluminum powder of less than 5 parts is undesirable because it causes the coating composition to be inferior in weatherability and corrosion resistance. An amount of more than 70 parts is undesirable because coating composition is inferior in formability. Moreover, the total amount of metal powder of more than 150 parts is undesirable because the resultant composite material coating is inferior in formability. The amount of plasticizer and stabilizer is added to impart good formability and durability.

Next, the composition and function of the acrylic-type resin film, which is a preferred embodiment, will be discussed.

The acrylic-type resin film may be comprised of one of the following composition Nos. 1 to 4, employing one or more of the following components A, B and C.

Component A = $C_1$–$C_4$ alkyl methacrylate.
Component B = $C_1$–$C_8$ alkyl acrylate.
Component C = ethylene-type monomer which is capable of being copolymerized with A and B.

Composition No. 1 mainly consists of the polymer of A.

Composition No. 2 mainly consists of a blend of polymers A and B.

Composition No. 3 mainly consists of the copolymer of A and B.

Composition No. 4 mainly consists of the copolymer of A, B and C.

Composition Nos. 1 to 4 may contain additives such as ultraviolet absorbers, pigment etc. The acrylic-type resin film is 20 to 200 μm in thickness.

Next the process for obtaining the coated metal sheets of the present invention will be described.

Hot dip galvanized steel sheet, electrogalvanized steel sheet or electrolytic chromate treatment steel sheet etc. are used as the substrate steel sheet. Well-known adhesive for polyvinylchloride-metal laminated steel, which is of acrylic-type, epoxy-type, urethane type or rubber-type etc. is used as adhesive. The substrate steel sheet is precoated with adhesive, baked by heat treatment, and covered with the composite materials by coating or laminating. In case of coating, the coating composition is used as a paste of suitable viscosity. The substrate steel sheet with adhesive is coated with this composition by roll coating, dipping, knife coating, or curtain coating etc., and then baked by heat treatment at 150° C. to 250° C. for gelation and adhesion.

In case of laminating, the composite material is first formed as film or sheet by calendering, extrusion etc. Then, the substrate steel sheet with adhesive is heated, laminated with this film by a roll press or the like and then the resultant product is heated at 150° C. to 250° C. to insure adhesion.

The coated metal sheet of the present invention is produced by the process described above.

The coated metal sheet may be overlaid with an acrylic-type resin film, which is a preferred embodiment of the present invention, as follows. After the substrate steel sheet is covered with the composite materials as described above, it is overlaid with acrylic-type resin film by a roll press etc. at 100° C. to 250° C., and then in certain cases, is heated at 100° C. to 250° C. for the purpose of improving adhesion.

The detailed effects of the present invention will now be explained taking into account the following practical, non-limitative examples.

EXAMPLE 1

The electrolytic chromate treatment steel sheet of 0.5 mm thickness (Trademark: Hi-Top) was coated with an epoxy-type adhesive in 5 μm thickness by a bar coater and heated in a hot-air oven for 30 seconds at 300° C. The temperature of the steel sheet was 230° C. Then the steel sheet was cooled, coated with the composite materials at 200 μm thickness by a knife coater and baked by hot-air oven for 60 seconds at 260° C. The temperature of the steel sheet was 200° C. Then the steel sheet was cooled.

The composition of the composite material was as follows with reference to parts being by weight.

polyvinylchloride resin (Trademark: Geon 121L): 100 parts
flake-like aluminum powder (0.5 μm thickness): 20 parts
plasticizer (n-D.O.P.): 50 parts
stabilizer (Cd-Ba type): 3 parts
diluent (mineral spirits): 10 parts The Dupont impact test ($\frac{1}{2}''$ × 1 Kg × 50 cm) was applied to this coated steel sheet. This coated steel sheet showed no evidence of adhesion loss and cracking of the coated layer. Also, this coated steel sheet was subjected to an outdoor exposure test and the steel sheet did not show adhesion loss and degradation such as discoloration and cracking of the coated layer, even after 8 years.

On the other hand, a reference sample, which was coated with a composition wherein titanium white was used in place of micaceous aluminum powder, was spoiled remarkably after 5 years in the outdoor exposure test and showed slight adhesion loss and discoloration of the coated layer after 3 years.

Next, an aluminum rich paint consisting of aluminum powder and an epoxy-type resin as binder was coated on an electrolytic chromate treatment steel sheet in about 200 μm thickness. This coated steel sheet was subjected to outdoor exposure tests as a reference sample. This sample showed slightly spotty rust after about 2 years and showed red rust over the whole surface after 5 years. Also this sample was subjected to the Dupont impact test ($\frac{1}{2}''$ × 1 Kg × 50 cm), but showed cracking and adhesion loss of the coated layer.

EXAMPLE 2

To the coating composition of Example 1, 50 parts by weight of lead powder of 10 μm particle diameter was added. The coated steel sheet obtained was essentially the same as that of Example 1. This coated steel sheet showed no adhesion loss and cracking of the coated layer after Dupont impact test ($\frac{1}{2}''$ × 1 Kg × 50 cm). Further, this coated steel sheet showed no adhesion loss and degradation such as discoloration and cracking in the coated layer after an outdoor exposure test for 10 years.

EXAMPLE 3

A composite coated steel sheet was produced as in Example 1. When the temperature of this sample was about 180° C., this sample was overlaid with a blue acrylic-type resin film of 30 μm thickness by press rolling, and heated by hot air oven for 60 seconds at 260° C. The temperature of this sample was about 200° C. Then this sample was cooled. This sample was subjected to the Dupont impact test ($\frac{1}{2}''$ × 1 Kg × 50 cm). This sample showed no evidence of adhesion loss and cracking of the coated layer. Also, after this sample was cross-hatched on the coated layer by a razor and was found to have a coating depth of 8 mm by the Erichsen test, the sample was subjected to the accelerated weathering test (Sunshine Weather Meter Test) JIS A 1415.

Consequently, these samples showed no evidence of cracking, discoloration, blister and adhesion loss of coated layer after 8000 hrs. Then, the cross-hatched sample was subjected to the salt spray test by JIS Z 2371 for 300 hrs. The length of delamination of the coated layer was under 1 mm.

On the other hand, a reference sample using titanium white as in Example 1 was overlaid with a blue acrylic-type resin film of 30 μm thickness.

This reference sample was subjected to the same tests. In Sunshine Weather Meter test, this reference sample showed slight unevenness of the surface and blistering of 3 to 10 mm length after 8000 hrs. In the salt spray test, this reference sample showed delamination of 7 to 17 mm length and red rust.

What is claimed is:

1. A coated sheet comprising a steel sheet substrate coated with a composition which comprises a 100 parts by weight polyvinylchloride resin and 5 to 70 parts by weight of flake-like aluminum powder and baked at 150° to 250° C.

2. The coated metal sheet of claim 1, wherein said coating further comprises at least one other metal powder selected from the group consisting of zinc, tin and lead and alloys of said metals, the total amount of flake-like aluminum powder and said other metal powder being 5 to 150 parts by weight.

3. The coated metal sheet of claim 1 or 2, which further comprises a top layer of an acrylic-type resin film of 20 to 200 μm thickness.

4. The coated metal sheet of claims 1 or 2 wherein said coating composition further comprises a plasticizer or a stabilizer or both.

5. The coated metal sheet of claim 1 or 2 wherein said coating is applied by forming a paste of said composition, applying said paste to said metal sheet substrate and baking said paste on said metal sheet to form a solid coating thereon.

6. The coated metal sheet of claims 1 or 2 wherein said coating is applied by laminating a film or sheet comprising said polyvinylchloride resin and flake-like aluminum powder to said metal sheet substrate.

7. The coated metal sheet of claims 1 or 2 wherein an adhesive is applied to said substrate before said coating is applied.

* * * * *